United States Patent
Kim et al.

(10) Patent No.: US 10,259,977 B2
(45) Date of Patent: Apr. 16, 2019

(54) ADHESIVE COMPOSITION FOR TOUCH SCREEN PANEL, OPTICAL ADHESIVE FILM AND TOUCH SCREEN PANEL

(71) Applicant: LG Chem, Ltd., Seoul (KR)

(72) Inventors: Won-Ho Kim, Seoul (KR); Sle Lee, Seo-gu (KR); Chan-Oh Yoon, Chungcheongbuk-do (KR); Jang-Soon Kim, Gyeonggi-do (KR); Eun-Kyung Park, Seoul (KR); Bu-Gi Jung, Gyeonggi-do (KR); Min-Jeong Kim, Seoul (KR); Sang-Hwan Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 229 days.

(21) Appl. No.: 15/510,855

(22) PCT Filed: Sep. 16, 2015

(86) PCT No.: PCT/KR2015/009722
§ 371 (c)(1),
(2) Date: Mar. 13, 2017

(87) PCT Pub. No.: WO2016/043520
PCT Pub. Date: Mar. 24, 2016

(65) Prior Publication Data
US 2017/0260428 A1     Sep. 14, 2017

(30) Foreign Application Priority Data

Sep. 16, 2014   (KR) .................. 10-2014-0122866
Oct. 8, 2014    (KR) .................. 10-2014-0135554

(51) Int. Cl.
*C09J 11/08*  (2006.01)
*B32B 7/12*   (2006.01)
(Continued)

(52) U.S. Cl.
CPC ............ *C09J 11/08* (2013.01); *B32B 7/12* (2013.01); *B32B 27/08* (2013.01); *B32B 27/281* (2013.01);
(Continued)

(58) Field of Classification Search
CPC .................................................. B32B 2307/412
(Continued)

(56) References Cited

U.S. PATENT DOCUMENTS 4,379,887 A  *  4/1983  Overbergh ............. C09J 177/00
                                                       525/184
7,829,605 B2    11/2010  Watanabe et al.
(Continued)

FOREIGN PATENT DOCUMENTS

CN     102573940 A     7/2012
CN     103827158 A     5/2014
(Continued)

OTHER PUBLICATIONS

International Search Report from PCT/KR2015/009722, dated Nov. 27, 2015.

*Primary Examiner* — Fred M Teskin
(74) *Attorney, Agent, or Firm* — Lerner, David, Littenberg, Krumholz & Mentlik, LLP

(57) ABSTRACT

Provided is an adhesive composition including: a (meth)acrylic acid ester-based photo-curable resin; and an oxygen-free di-functional diene-based rubber hardener.

16 Claims, 1 Drawing Sheet

(51) Int. Cl.

| | | |
|---|---|---|
| *B32B 27/36* | (2006.01) | |
| *C09J 7/00* | (2018.01) | |
| *C09J 133/06* | (2006.01) | |
| *G06F 3/041* | (2006.01) | |
| *C09J 7/38* | (2018.01) | |
| *C09J 7/22* | (2018.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/40* | (2006.01) | |

(52) U.S. Cl.
CPC .......... *B32B 27/304* (2013.01); *B32B 27/306* (2013.01); *B32B 27/308* (2013.01); *B32B 27/32* (2013.01); *B32B 27/322* (2013.01); *B32B 27/36* (2013.01); *B32B 27/40* (2013.01); *C09J 7/00* (2013.01); *C09J 7/22* (2018.01); *C09J 7/38* (2018.01); *C09J 133/066* (2013.01); *G06F 3/041* (2013.01); *B32B 2250/03* (2013.01); *B32B 2255/10* (2013.01); *B32B 2255/26* (2013.01); *B32B 2307/202* (2013.01); *B32B 2307/412* (2013.01); *B32B 2457/202* (2013.01); *B32B 2457/208* (2013.01); *C08L 2312/06* (2013.01); *C09J 2201/602* (2013.01); *C09J 2203/318* (2013.01); *C09J 2400/163* (2013.01); *C09J 2433/00* (2013.01); *C09J 2467/006* (2013.01); *G06F 2203/04103* (2013.01)

(58) Field of Classification Search
USPC .......................... 522/39, 40, 42, 63; 525/910
See application file for complete search history.

(56) References Cited

U.S. PATENT DOCUMENTS

| | | |
|---|---|---|
| 2011/0045030 A1 | 2/2011 | Desai et al. |
| 2013/0236672 A1 | 9/2013 | Kim et al. |
| 2014/0206789 A1* | 7/2014 | Hashimoto .............. C08K 5/14 522/39 |
| 2014/0235758 A1 | 8/2014 | Cheng et al. |
| 2014/0243444 A1 | 8/2014 | Ikari et al. |
| 2014/0329927 A1 | 11/2014 | Ha et al. |
| 2015/0166855 A1 | 6/2015 | Lee et al. |

FOREIGN PATENT DOCUMENTS

| | | |
|---|---|---|
| JP | 2011032410 A | 2/2011 |
| KR | 20120056230 A | 6/2012 |
| KR | 20130063938 A | 6/2013 |
| KR | 20130063939 A | 6/2013 |
| KR | 20130143304 A | 12/2013 |
| KR | 20140092362 A | 7/2014 |
| TW | 201144399 A | 12/2011 |

* cited by examiner

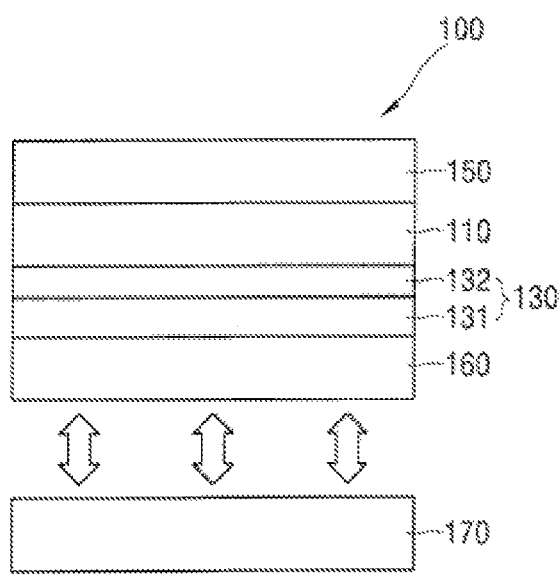

ADHESIVE COMPOSITION FOR TOUCH SCREEN PANEL, OPTICAL ADHESIVE FILM AND TOUCH SCREEN PANEL

CROSS-REFERENCE TO RELATED APPLICATIONS

The present application is a national phase entry under 35 U.S.C. § 371 of International Application No. PCT/KR2015/009722 filed Sep. 16, 2015, which claims priority from Korean Application No. 10-2014-0122866 filed on Sep. 16, 2014 and Korean Application No. 10-2014-0135554 filed on Oct. 8, 2014, all of which are incorporated herein by reference.

TECHNICAL FIELD

The present invention relates to an adhesive composition for a touch screen panel, an optical adhesive film, and a touch screen panel.

BACKGROUND ART

Recently, electronic devices such as PDAs, mobile communication terminals, or navigation systems for vehicles are forming a big market. In these electronic devices, examples of a technical goal to be pursued usually include thinner devices, lighter devices, power consumption reduction, high resolution devices, high luminance devices, and the like.

Meanwhile, transparent conductive plastic films are used in electronic devices in which a touch screen or a touch panel switch is installed at an input operation part in order to make devices lighter and prevent breakage of devices. Examples thereof include a film which uses a polyethylene terephthalate (PET) film as a base material and has a conductive layer, such as indium tin oxide (ITO), formed on one surface of the PET film, and the film is laminated on a conductive glass, a reinforcing material, a decoration film, and the like by an adhesive layer.

The adhesive layer requires various physical properties such as touch sensitivity and durability.

DETAILED DESCRIPTION OF THE INVENTION

Technical Problem

An exemplary embodiment of the present invention provides an adhesive composition having excellent touch sensitivity and excellent reliability.

Another exemplary embodiment of the present invention provides an optical adhesive film prepared from the adhesive composition.

Still another exemplary embodiment of the present invention provides a touch screen panel to which an optical adhesive film prepared from the adhesive composition for a touch screen panel is applied.

Technical Solution

An exemplary embodiment of the present invention provides an adhesive composition including: a (meth)acrylic acid ester-based photo-curable resin; and an oxygen-free di-functional diene-based rubber hardener.

The oxygen-free di-functional diene-based rubber hardener may include a diene-based di-functional group at both ends thereof.

The oxygen-free di-functional diene-based rubber hardener may include one selected from the group consisting of, for example, a di-functional polybutadiene, a di-functional isoprene rubber, a di-functional isobutylene-isoprene rubber or a di-functional styrene-butylene rubber, or a combination thereof.

The oxygen-free di-functional diene-based rubber hardener may have a weight average molecular weight from 3,000 to 20,000.

The oxygen-free di-functional diene-based rubber hardener may have a dielectric constant k value from 2.1 to 2.5 measured at a frequency of 100 kHz.

The adhesive composition may include 100 parts by weight of the (meth)acrylic acid ester-based photo-curable resin; and 0.1 to 2 parts by weight of the oxygen-free di-functional diene-based rubber hardener.

The (meth)acrylic acid ester-based photo-curable resin may be a resin in which a (meth)acrylic acid ester monomer and a crosslinkable monomer including at least one selected from the group consisting of a hydroxy group-containing monomer, a carboxyl group-containing monomer, or a nitrogen-containing monomer, and a combination thereof are copolymerized with each other.

The (meth)acrylic acid ester monomer is alkyl (meth)acrylate, and an alkyl of the alkyl (meth)acrylate may be a linear or branched C1 to C14 alkyl.

The (meth)acrylic acid ester monomer may include one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth) acrylate, n-octyl (meth) acrylate, isooctyl (meth)acrylate, isobornyl (meth) acrylate, isononyl (meth)acrylate, and a combination thereof.

The crosslinkable monomer may include one selected from the group consisting of 2-hydroxyethyl (meth)acrylate, 2-hydroxypropyl (meth) acrylate, 4-hydroxybutyl (meth) acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, acrylic acid, methacrylic acid, 2-(meth)acryloyloxy acetic acid, 3-(meth)acryloyloxy propyl acid, 4-(meth)acryloyloxy butyric acid, acrylic acid dimer, itaconic acid, maleic acid, 2-isocyanatoethyl (meth) acrylate, 3-isocyanatopropyl (meth) acrylate, 4-isocyanatobutyl (meth) acrylate, (meth)acrylamide, N-vinyl pyrrolidone, N-vinyl caprolactam, and a combination thereof.

The adhesive composition may further include a photoinitiator.

The photoinitiator may include one selected from the group consisting of a benzoin-based initiator, a hydroxyl ketone-based initiator, an amino ketone-based initiator, caprolactam, and a combination thereof.

Another exemplary embodiment of the present invention provides an optical adhesive film including: an adhesive layer which includes photo-cured products of the adhesive composition.

Still another exemplary embodiment of the present invention provides a touch screen panel including: a conductive plastic film layer having a conductive layer formed on one surface thereof; the optical adhesive film laminated on an upper portion of the conductive layer; and a cover window layer laminated on an upper portion of the optical adhesive film.

The conductive plastic film layer may be a polyethylene terephthalate film which has a conductive metal oxide layer formed on one surface thereof.

The cover window layer may be a transparent plastic film replacing glass or tempered glass.

Advantageous Effects

An optical adhesive film prepared from the adhesive composition has excellent touch sensitivity and excellent reliability.

BRIEF DESCRIPTION OF DRAWINGS

FIG. 1 is a schematic cross-sectional view of a touch screen panel according to an exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

The present invention provides an adhesive composition including: a (meth)acrylic acid ester-based photo-curable resin; and an oxygen-free di-functional diene-based rubber hardener.

When a touch screen panel of a display device such as a mobile phone and a tablet PC is prepared, an optical adhesive film used as a bonding medium for bonding a conductive plastic film layer, which has a conductive layer formed on one surface thereof, and a cover window layer may be prepared from the adhesive composition.

An optical adhesive film may be formed by photo-curing the (meth)acrylic acid ester-based photo-curable resin of the adhesive composition, and the optical adhesive film is optically clearly formed and thus can be applied to a touch screen panel, and also has low permittivity. The optical adhesive film having low permittivity as described above is usefully applied to a touch screen panel because the touch sensitivity is increased.

The oxygen-free di-functional diene-based rubber hardener in the adhesive composition is a material having low permittivity, and contributes to implementing the low permittivity of the optical adhesive film.

The oxygen-free di-functional diene-based rubber hardener is di-functional while having low permittivity, and thus may act as a crosslinking agent between the (meth)acrylic acid ester-based photo-curable resins during the hardening.

Specifically, the oxygen-free di-functional diene-based rubber hardener may include a diene-based di-functional group at both ends thereof.

The oxygen-free di-functional diene-based rubber hardener does not contain oxygen having high electronegativity, and thus may implement low permittivity as a non-polarity.

Since the oxygen-free di-functional diene-based rubber hardener has di-functionality as described above, the oxygen-free di-functional diene-based rubber hardener can serve as a crosslinker, but need not be polyfunctional of tri-functional or more. That is, the oxygen-free di-functional diene-based rubber hardener is suitable for preparing an adhesive film because the oxygen-free di-functional diene-based rubber hardener is di-functional and thus combined with the (meth)acrylic acid ester-based photo-curable resin. This is because a (meth)acrylic acid ester-based photo-curable resin has a certain degree of hardness after being cured, and the crosslinking site is elongated if a polyfunctional compound of tri-functional or more is used as the hardener, such that an adhesive film prepared therefrom is excessively hardened, and thus is not suitable as an adhesive film.

Therefore, the oxygen-free di-functional diene-based rubber hardener may not include other functional groups except for the diene-based functional group at both ends thereof.

The oxygen-free di-functional diene-based rubber hardener may have a weight average molecular weight from about 3,000 to about 20,000. That is, the oxygen-free di-functional diene-based rubber hardener is a diene-based rubber compound having the weight average molecular weight level, and may be in the form of a resin or an oligomer. An oxygen-free di-functional diene-based rubber hardener having a weight average molecular weight within the range may appropriately act as a hardener.

The oxygen-free di-functional diene-based rubber hardener may have a dielectric constant k value from about 2.1 to about 2.5 measured at a frequency of 100 kHz.

The oxygen-free di-functional diene-based rubber hardener may include a di-functional polybutadiene, a di-functional isoprene rubber, a di-functional isobutylene-isoprene rubber, a di-functional styrene-butylene rubber, and the like or a combination thereof.

As described above, the adhesive composition for a touch screen panel includes the oxygen-free di-functional diene-based rubber hardener, and thus may be prepared so as to have low permittivity, and specifically, may be prepared so as to have a dielectric constant k value of 3.0 or less measured at a frequency of 100 kHz. An optical adhesive film prepared from an adhesive composition for a touch screen panel, which has low permittivity, has excellent touch sensitivity.

The adhesive composition may include: about 100 parts by weight of the (meth)acrylic acid ester-based photo-curable resin; and about 0.1 to about 2 parts by weight of the oxygen-free di-functional diene-based rubber hardener.

The (meth)acrylic acid ester-based photo-curable resin may be a resin in which a (meth)acrylic acid ester monomer and a crosslinkable monomer including at least one selected from the group consisting of a hydroxy group-containing monomer, a carboxyl group-containing monomer, or a nitrogen-containing monomer, and a combination thereof are copolymerized with each other.

The (meth)acrylic acid ester monomer is specifically alkyl (meth)acrylate, and an alkyl of the alkyl (meth)acrylate may be a linear or branched C1 to C14 alkyl.

The (meth)acrylic acid ester monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth) acrylate, 2-ethylhexyl (meth)acrylate, 2-ethylbutyl (meth) acrylate, n-octyl (meth)acrylate, isooctyl (meth)acrylate, isobornyl (meth)acrylate, isononyl (meth)acrylate, and the like, or may include a combination thereof.

The crosslinkable monomer means a monomer including both a copolymerizable functional group (for example, a carbon-carbon double bond) and a crosslinkable functional group in the molecular structure.

The crosslinkable monomer may include one selected from the group consisting of, for example, a hydroxy group-containing monomer, a carboxyl group-containing monomer, or a nitrogen-containing monomer, and a combination thereof, and is not limited thereto.

The crosslinkable monomer may be, specifically, a hydroxy group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth) acrylate, 2-hydroxyethylene glycol (meth)acrylate, and 2-hydroxypropylene glycol (meth)acrylate; a carboxyl group-containing monomer such as acrylic acid, methacrylic acid, 2-(meth)acryloyloxy acetic acid, 3-(meth)acryloyloxy propyl acid, 4-(meth)acryloyloxy butyric acid, acrylic acid dimer, itaconic acid, and maleic acid; a nitrogen-containing monomer such as 2-isocyanatoethyl (meth) acrylate, 3-isocyanatopropyl (meth) acrylate, 4-isocyanatobutyl (meth) acrylate, (meth)acrylamide, N-vinyl pyrrolidone, and N-vinyl caprolactam; and the like, and may include one selected from the group consisting of a combination thereof.

The adhesive composition may further include a photoinitiator in order to adjust the polymerization degree as a photo-curable composition. The photoinitiator may be used in a content of 0.01 to 10 parts by weight based on 100 parts by weight of the (meth)acrylic acid ester-based photo-curable resin, the kind of photoinitiator is not particularly limited as long as the photoinitiator may generate radicals by light irradiation to initiate a polymerization reaction, and the photoinitiator may include one selected from the group consisting of, for example, a benzoin-based initiator, a hydroxy ketone-based initiator, an amino ketone-based initiator, caprolactam, and a combination thereof.

Further, the adhesive composition may further include one or more additives selected from the group consisting of an epoxy resin, a crosslinking agent, a UV stabilizer, an antioxidant, a colorant, a reinforcing agent, a filler, an anti-foaming agent, a surfactant, a plasticizer, and a combination thereof within a range not affecting the effects of the invention.

Another exemplary embodiment of the present invention provides an optical adhesive film including photo-cured products of the adhesive composition.

The adhesive composition for a touch screen panel may be applied on a base material layer, and then photo-cured by light irradiation, thereby preparing an optical adhesive film. The "light irradiation" means an irradiation of electromagnetic waves capable of causing a polymerization reaction by affecting a photoinitiator or a polymerizable compound, and the aforementioned electromagnetic wave is used to be collectively referred as a microwave, an infrared ray, a UV ray, an X-ray, and a Y-ray, and a particle beam such as an α-particle ray, a proton beam, a neutron beam, and an electron beam.

A method for preparing the optical adhesive film by photo-curing the adhesive composition is not particularly limited. For example, the optical adhesive film may be prepared by a method of applying the above-described adhesive composition or a coating solution prepared by adding a solvent to the adhesive composition on an appropriate process base material by a publicly known means such as a bar coater, and hardening the adhesive composition or the coating solution.

After a volatile component included in an adhesive composition or a coating solution or a bubble inducing component such as a reaction residue is sufficiently removed, the hardening process may be carried out, thereby appropriately imparting a crosslinking density or a molecular weight, an elastic modulus, and the like of the hardened product, and preventing a problem in that bubbles present at the adhesive interface in a high temperature state are increased and thus form a scattering body therein, and the like.

In addition, a method of hardening the adhesive composition or the coating solution is not particularly limited, and for example, ultraviolet rays are irradiated onto the adhesive composition or a coating layer formed by the coating solution, or an aging process is carried out under a predetermined condition, and then a hardening process may be carried out.

The photo-curing may be carried out by, for example, UV irradiation.

The UV irradiation for the photo-curing may be carried out by using a typically used metal halide lamp for about 10 seconds to about 15 seconds.

The amount of UV irradiated light is preferably about 0.5 J/cm$^2$ to about 2.0 J/cm$^2$, and more preferably about 1.0 J/cm$^2$ to about 1.5 J/cm$^2$.

The optical adhesive film may have a thickness from about 50 μm to about 300 μm, specifically, from about 100 μm to about 200 μm. It is possible to implement an adhesive film having excellent durability while being capable of being applied to a thin-type touch panel or touch screen by allowing the optical adhesive film to have a thickness within the range.

Still another exemplary embodiment of the present invention provides a touch screen panel including: a conductive plastic film layer having a conductive layer formed on one surface thereof; the optical adhesive film laminated on an upper portion of the conductive layer; and a cover window layer laminated on an upper portion of the optical adhesive film.

The cover window layer may use tempered glass or a transparent plastic film replacing glass developed as a material capable of replacing tempered glass. The plastic film replacing glass has a multi-layered structure and may be formed by imparting various functionalities to each layer.

FIG. 1 is a schematic cross-sectional view of a touch screen panel 100.

In FIG. 1, the touch screen panel 100 may include: a cover window layer 150; an optical adhesive film 110; a conductive plastic film layer 130 having a conductive layer 132 formed on one surface of a plastic base material layer 131; and a transparent substrate 160. Furthermore, the touch screen panel 100 including each layer as described above may be attached to a display device such as a liquid crystal display (LCD) 170.

The optical adhesive film 110 is a layer formed by photo-curing the adhesive composition, and a detailed description on the optical adhesive film 110 is the same as that described above.

The specific kind of conductive plastic film layer 130 is not particularly limited, and a publicly-known conductive film in the art may be used. For example, the conductive film 130 may be a transparent plastic film having an ITO electrode layer formed as the conductive layer 132 on one surface thereof. Specifically, as the transparent plastic film forming the plastic base material layer 131, it is possible to use a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film or a polyimide film, and the like, and the transparent plastic film is not limited thereto. More specifically, the plastic base material layer 131 may be a polyethylene terephthalate (PET) film.

Hereinafter, Examples and Comparative Examples of the present invention will be described. However, the following Examples are only an Example of the present invention, and the present invention is not limited to the following Examples.

EXAMPLES

Example 1

85 parts by weight ethylhexyl acrylate and 15 parts by weight of hydroxypropyl acrylate as a crosslinkable monomer were put into a 1-L glass reactor, and thermally polymerized, thereby obtaining a photo-curable acrylic copolymerization resin syrup having a viscosity of 35 cP. For the photo-curable acrylic copolymerization resin syrup, a calculated value of a hydroxyl value measured was 62 mg KOH/g. 100 parts by weight (based on a solid content) of the obtained photo-curable acrylic copolymerization resin was mixed with 0.5 parts by weight of a di-functional butadiene rubber hardener, 0.5 parts by weight of a,a-methoxy-a-hydroxyacetophenone (Irgacure 651, manufactured by Ciba Specialty Chemicals Co., Ltd.) as a photoinitiator, and 0.35 parts by weight of 1,6-hexanediol diacrylate (HDDA) as a crosslinking agent, and then the resulting mixture was sufficiently stirred, thereby preparing an adhesive composition. Subsequently, the adhesive composition was film-formed to have a thickness of 100 μm and the film was photo-cured, thereby preparing an optical adhesive film as a cured film.

Example 2

A photo-curable acrylic copolymerization resin syrup was prepared in the same manner as in Example 1, and an optical adhesive film was prepared in the same manner as in Example 1, except that 2.0 parts by weight of a di-functional butadiene rubber hardener was used based on 100 parts by weight of the obtained photo-curable acrylic copolymerization resin.

Comparative Example 1

A photo-curable acrylic copolymerization resin syrup was prepared in the same manner as in Example 1, and an optical adhesive film was prepared in the same manner as in Example 1, except that 0.5 parts by weight of a di-functional urethane hardener instead of the di-functional butadiene rubber hardener was used based on 100 parts by weight of the obtained photo-curable acrylic copolymerization resin.

Comparative Example 2

A photo-curable acrylic copolymerization resin syrup was prepared in the same manner as in Example 1, and an optical adhesive film was prepared in the same manner as in Example 1, except that 2.0 parts by weight of a di-functional urethane hardener instead of the di-functional butadiene rubber hardener was used based on 100 parts by weight of the obtained photo-curable acrylic copolymerization resin.

Evaluation

Experimental Example 1

An electrode was brought into contact with both surfaces of each of the optical adhesive films prepared in Examples 1 and 2 and Comparative Examples 1 and 2 under the following device and conditions, and then a dielectric constant k value was measured and is shown in the following Table 1.
Device: Agilent Technologies E4980A LCR meter
Test Frequencies: 20 Hz to 2 MHz
Electrode diameter: 5 mm

Experimental Example 2

After the laminated structures of glass/adhesive film/glass were manufactured by using the optical adhesive films prepared in Examples 1 and 2 and Comparative Examples 1 and 2, the structures were left to stand in a thermo-hygrostat (85° C./85% RH) for 3 days, and then it was confirmed by the unaided eye whether bubbles were generated.

Experimental Example 3

After the laminated structures of glass/adhesive film/glass were manufactured by using the optical adhesive films prepared in Examples 1 and 2 and Comparative Examples 1 and 2, 30 cycles based on one cycle (−40° C. 1 hour/80° C. 1 hour) were performed, and then it was confirmed by the unaided eye whether bubbles were generated, and the results are shown in the following Table 1.

TABLE 1

| | Permittivity (@100 kHz) | Whether bubbles are generated after structure is left to stand at 85° C./85% RH for 3 days | Whether bubbles are generated after a thermal impact test- 40° C./80° C. 30 cycles |
|---|---|---|---|
| Example 1 | 3.16 | X | X |
| Example 2 | 2.98 | X | X |
| Comparative Example 1 | 3.24 | ○ | ○ |
| Comparative Example 2 | 3.46 | X | X |

As can be seen from Table 1, it can be confirmed that bubbles were generated in Comparative Example 1 and the permittivity was relatively high in Comparative Example 2, but bubbles were not generated in Examples 1 and 2, and as a result, Examples 1 and 2 implemented low permittivity while exhibiting excellent reliability.

Although preferred exemplary embodiments of the present invention have been described in detail hereinabove, the right scope of the present invention is not limited thereto, and many variations and modifications of a person skilled in the art using the basic concept of the present invention, which is defined in the following claims, also fall within the right scope of the present invention.

EXPLANATION OF REFERENCE NUMERALS AND SYMBOLS

100: Touch screen panel
110: Optical adhesive film
131: Plastic base material layer
132: Conductive layer
130: Conductive plastic film layer
150: Cover window layer
160: Transparent substrate
170: Liquid crystal display (LCD)

The invention claimed is:
1. An adhesive composition comprising:

a (meth)acrylic acid ester-based photo-curable resin; and
an oxygen-free di-functional diene-based rubber hardener.

2. The adhesive composition of claim 1, wherein the oxygen-free di-functional diene-based rubber hardener comprises a diene-based di-functional group at both ends thereof.

3. The adhesive composition of claim 1, wherein the oxygen-free di-functional diene-based rubber hardener comprises one selected from the group consisting of a di-functional polybutadiene, a di-functional isoprene rubber, a di-functional isobutylene-isoprene rubber, a di-functional styrene-butylene rubber, and a combination thereof.

4. The adhesive composition of claim 1, wherein the oxygen-free di-functional diene-based rubber hardener has a weight average molecular weight from 3,000 to 20,000.

5. The adhesive composition of claim 1, wherein the oxygen-free di-functional diene-based rubber hardener has a dielectric constant k value from 2.1 to 2.5 measured at a frequency of 100 kHz.

6. The adhesive composition of claim 1, wherein the adhesive composition comprises:
   100 parts by weight of the (meth)acrylic acid ester-based photo-curable resin; and
   0.1 to 2 parts by weight of the oxygen-free di-functional diene-based rubber hardener.

7. The adhesive composition of claim 1, wherein the (meth)acrylic acid ester-based photo-curable resin is a resin in which a (meth)acrylic acid ester monomer and a crosslinkable monomer comprising at least one selected from the group consisting of a hydroxy group-containing monomer, a carboxyl group-containing monomer, or a nitrogen-containing monomer, and a combination thereof are copolymerized with each other.

8. The adhesive composition of claim 7, wherein the (meth)acrylic acid ester monomer is alkyl (meth)acrylate, and an alkyl of the alkyl (meth)acrylate is a linear or branched C1 to C14 alkyl.

9. The adhesive composition of claim 7, wherein the (meth)acrylic acid ester monomer comprises one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and a combination thereof.

10. The adhesive composition of claim 7, wherein the crosslinkable monomer comprises one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, acrylic acid, methacrylic acid, 2-(meth)acryloyloxy acetic acid, 3-(meth)acryloyloxy propyl acid, 4-(meth)acryloyloxy butyric acid, acrylic acid dimer, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinyl pyrrolidone, N-vinyl caprolactam, and a combination thereof.

11. The adhesive composition of claim 1, further comprising:
    a photoinitiator.

12. The adhesive composition of claim 11, wherein the photoinitiator comprises one selected from the group consisting of a benzoin-based initiator, a hydroxy ketone-based initiator, an amino ketone-based initiator, caprolactam, and a combination thereof.

13. An optical adhesive film comprising:
    an adhesive layer which comprises photo-cured products of the adhesive composition according to claim 1.

14. A touch screen panel comprising:
    a conductive plastic film layer having a conductive layer formed on one surface thereof;
    the optical adhesive film according to claim 13 laminated on an upper portion of the conductive layer; and
    a cover window layer laminated on an upper portion of the optical adhesive film.

15. The touch screen panel of claim 14, wherein the conductive plastic film layer is a polyethylene terephthalate film having a conductive metal oxide layer formed on one surface thereof.

16. The touch screen panel of claim 14, wherein the cover window layer is a transparent plastic film replacing glass or tempered glass.

* * * * *